United States Patent [19]

Brandenstein et al.

[11] Patent Number: 4,611,931
[45] Date of Patent: Sep. 16, 1986

[54] SEALED ROLLER BEARING

[75] Inventors: Manfred Brandenstein, Eussenheim; Ludwig Edelmann, Sulzthal; Karl-Friedrich Kaschube, Niederwerrn, all of Fed. Rep. of Germany

[73] Assignee: SKF GmbH, Schweinfurt, Fed. Rep. of Germany

[21] Appl. No.: 717,186

[22] Filed: Mar. 29, 1985

[30] Foreign Application Priority Data

Mar. 31, 1984 [DE] Fed. Rep. of Germany ... 8410074[U]

[51] Int. Cl.[4] .................... F16C 33/72; F16C 33/76; F16J 15/32
[52] U.S. Cl. .................................. 384/477; 277/152; 277/215; 384/484; 384/486
[58] Field of Search ................ 384/477, 481, 482–488; 277/152, 153, 215

[56] References Cited

U.S. PATENT DOCUMENTS

| | | | |
|---|---|---|---|
| 2,482,029 | 9/1949 | Reynolds | 277/152 |
| 2,657,080 | 10/1953 | Johnson | 277/152 X |
| 3,814,446 | 6/1974 | Derman | 384/486 X |
| 4,399,998 | 8/1983 | Otto | 277/153 X |
| 4,489,992 | 12/1984 | Brandenstein et al. | 384/496 |

FOREIGN PATENT DOCUMENTS

| | | | |
|---|---|---|---|
| 1040930 | 9/1966 | United Kingdom | 277/152 |
| 1057629 | 2/1967 | United Kingdom | 277/153 |

Primary Examiner—Stuart S. Levy
Assistant Examiner—Thomas R. Hannon
Attorney, Agent, or Firm—Eugene E. Renz, Jr.

[57] ABSTRACT

Sealed roller bearing with a plastic jacket, in which this jacket, continuing in the radial direction on at least one side of the roller bearing, is designed to form a seal by way of at least one ring lip with a shaft or the like, characterized in that the seal has annular grooves extending axially on both sides of the radial side surfaces, and in that at least one edge area in the transition from the bore surface to the radial side surfaces is designed as a tilting edge, which lifts the ring lip radially from the sealing surface during axial displacement.

2 Claims, 2 Drawing Figures

SEALED ROLLER BEARING

FIELD OF THE INVENTION

The present invention relates to sealed rolling bearings and specifically to a seal arrangement incorporating a structure providing a tilting action which lifts the sealing ring radially from the sealing surface during axial displacement of the bearing assembly.

BACKGROUND OF THE INVENTION

West German Offenlegungsschrift No. 3,039,422 shows a bearing having a plastic jacket including a radially directed portion forming a sealing lip adapted to engage the inner ring. While this seal is generally satisfactory from a functional viewpoint and does not present serious difficulties in assembling the ball bearing since the sealing lip contacts essentially a radial surface of the inner ring, it is noted, however, that when the contact surface of the inner ring is a cylindrical surface, during the assembly process, the seal must first be pushed over the edge area of the inner ring before it can assume its proper sealing position. It has been observed that during assembly in this fasion, the ring lip suffers considerable damage which means that the desired sealing effect is impaired at the time of assembly. The damage is accentuated and can be even greater, for example, when the inner ring raceway is on a shaft and when assembly requires that the seal be pushed over a rather long cylindrical section of the shaft. Shafts are often stepped down in diameter, having only coarsely machined cylindrical sections that are provided with annular grooves. In these instances, it it possible to effect satisfactory assembly only by the expenditure of additional effort while the risk of damaged seals must simply be accepted.

In another prior art design of the type shown in West German Registered Design No. 71-10,331, the sealing element is provided with annular grooves which provide a degree of radial elasticity. The entire seal, however, is guided in a housing part provided with a groove. It has been observed that the ring sealing lip becomes damaged when it is assembled in the manner described above.

SUMMARY OF THE PRESENT INVENTION

With the foregoing in mind, it is an object of the present invention to provide a sealed rolling bearing of the type described which is characterized by novel features of construction and arrangement facilitating assembly of the seal in a manner which does not cause damage thereto during the assembly process. To this end, the bearing assembly has at least one radially directed sealing element having at least one annular groove extending in an axial direction preferably on both sides of the radial side faces of the sealing lip and is provided with at least one edge area in the transition from the circumferentially extending bore surface of the sealing lip to the radial side faces designed for and functioning as a tilting edge which operates to lift the sealing lip radially from a sealing surface during axial displacement which may occur during assembly. More specifically, the axially extending annular groove are configured in such a way that the seal is deflected axially as a result of a braking force when, for example, it is pushed onto a shaft member or the like. In this instance, the seal behaves much like an axially loaded membrane into which annular creases had been formed, for example, by machining. The sealing lip which is normally in pressure applying contact against the surface of the shaft tilts sharply so that the entire seal is deformed into a generally conical shape. As a result of this deformation, the corresponding edge area which as noted above is designed as a tilting edge contacts the surface of the shaft or other sealing surface and lifts the actual sealing lip from its sealing surface on the shaft. The tilting edge may be located in the other edge area of the seal. Accordingly, as the seal is pushed further on the shaft to its mounted position, only the tilting edge remains in contact with the shaft and thus, takes over the sliding function between the seal assembly and the shaft during the assembly operation. Accordingly, the sources of damage otherwise acting on the sealing lip per se are here withstood and absorbed in an advantageous manner over the entire periphery of the tilting edge. When the assembly has been located in place, it is only necessary to tilt the rolling bearing assembly slightly in the opposite direction to move the seal from its locked position after assembly to the functioning position. This tilting action occurs automatically by means of the axial membrane-like intrinsic elasticity. Thus, ease of assembly without damage to the sealing elements of the seal comprise the advantage of the rolling bearing assembly in accordance with the present invention.

In accordance with an additional feature of the present invention, both edge areas of the sealing lip may be provided with tilting edges which are designed as circumferentially extending annular ring lips. In this instance, each ring lip can be used as a seal or as a tilting edge and thus, the advantages of the present invention are derived irrespective of which direction the seal is moved axially during assembly. By virtue of the braking action of a ring lip or tilting edge on the shaft, the other ring lip or tilting edge is lifted and the damage of the type described above is obviated.

In accordance with a modified embodiment of the present invention, a circumferentially extending radially projecting ring lip is located between two tilting edges disposed on either side of the ring lip. The ring lip is preferably advantageously located centrally between the tilting edge and projects slightly beyond the tilting edges in a radial direction. The edge areas of the seal are merely provided with sharp edges in order to effect a high contact pressure when the seal is being urged onto the shaft to achieve the required braking action with the shaft. This design has the advantage that the ring lip is lifted irrespective of which axial direction the rolling bearing assembly is moved when applied to a shaft so that the seal remains undamaged even during disassembly.

BRIEF DESCRIPTION OF THE DRAWINGS

These and other objects of the present invention and the various features and details of the operation and construction thereof are hereinafter more fully set forth with reference to the accompanying drawings, wherein:

FIG. 2 is a longitudinal sectional view of a modified embodiment of seal in accordance with the present invention with ring lips-tilting edges on both sides, the view illustrating various positions of the seal as it is assembled on a shaft member or the like.

DESCRIPTION OF THE PREFERRED EMBODIMENTS

Figure 1:
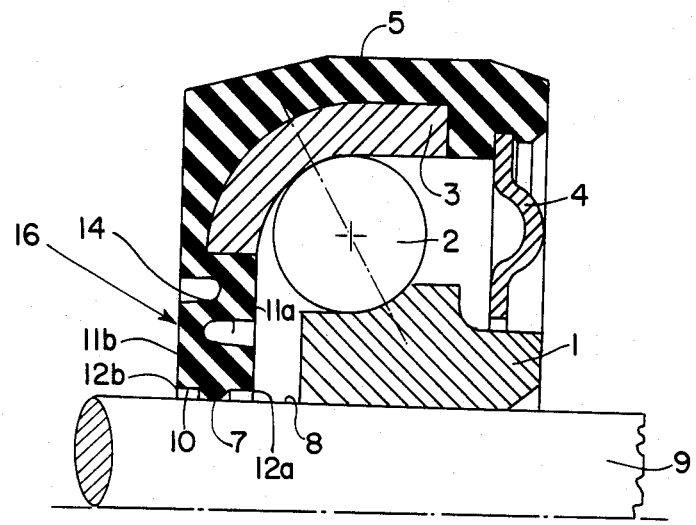
FIG. 1 is a longitudinal sectional view of a plastic jacketed ball bearing incorporating a seal with a ring lip constructed in accordance with the present invention.

Referring now to the drawings and particularly to FIG. 1 thereof, there is illustrated a ball bearing assembly incorporating novel sealing means in accordance with the present invention. The ball bearing assembly as illustrated has an inner ring 1 mounted on a shaft member or the like 9, an outer ring 3 and a plurality of balls 2 in the annular space between the inner and outer raceways 1a and 3a, respectively. Note the metallic outer ring 3 is imbedded or encapsulated in an annular outer housing or jacket 5 which as illustrated includes a radially directed projection, in the present instance, on the left side of the bearing defining a sealing element 6 which as illustrated makes contact by way of a ring lip 7 with the outer peripheral surface 8 of the shaft member 9. In the present instance, ring lip 7 is located axially in the center between the end edge 12a and 12b where the inner bore surface 10 of the seal makes the transition to the inner and outer radial side faces 11a and 11b.

Figure 2:
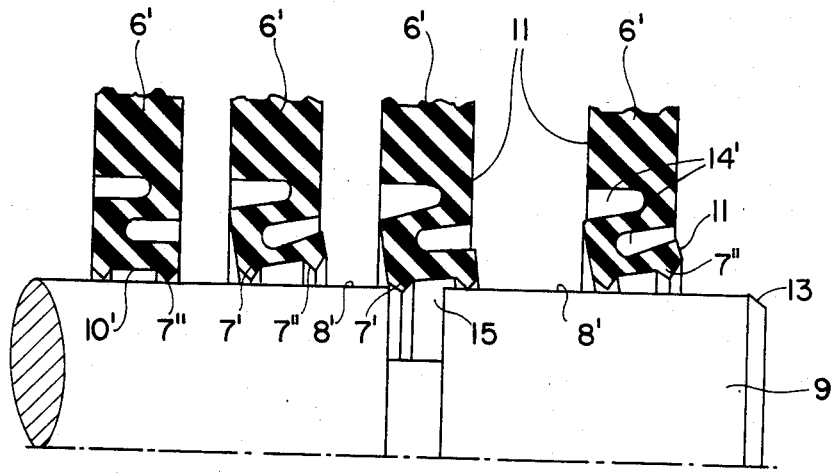

In accordance with the present invention, at least one and preferably both side faces 11a, 11b are provided with circumferentially extending axially directed channels or grooves 14 which as illustrated are radially spaced apart and facilitate a tilting or cocking action of the seal when the entire assembly is moved on the shaft to lcoate it in a predetermined assembled position. Note that the edges 12a, 12b are designed as sharp edges and thereby serve as a tilting edge or fulcrum whereby when the bearing is moved axially on the shaft to assemble it, the edges 12a, 12b contact the peripheral surface 8 to the shaft creating a braking action which causes tilting of the seal as promoted by the annular grooves 14 and deformation thereof into a conical configuration as best illustrated in FIG. 2. By reason of this action, the ring lip 7 is lifted from the peripheral surface 8 of the shaft during assembly thereby protecting the same until the entire assembly has been located in the desired position on the shaft. When the entire assembly has reached its ultimate axial position on the shaft and the axial displacement or pushing process has ended, the seal tends to straighten itself so that the ring lip 7 contacts the peripheral surface 8 to perform a sealing function. This straightening or radial aligning action occurs usually during the first relative rotational movement between the outer ring 3 or seal 6 and shaft 9. The diameter of the sealing surface, in this instance the surface 8 of the shaft, is preferably slightly greater than the diameter of the inner peripheral surface of the ring lip 7. The diameter of the bore surface 10 is slightly greater than the diameter of the shaft sealing surface 8 to provide the tilting and sealing action described. The net effect is that the critical sealing area is protected during the assembly operation to assure a good sealing characteristic when it is in place.

In accordance with an alternate embodiment of the present invention illustrated in FIG. 2, the seal 6' is provided with ring lips 7' at adjacent outer axial ends of the bore surface 10' which can function either as seals or as tilting edges. This emodiment also includes the circumferentially extending annular grooves 14' preferably in both radial side faces of the seal 6'. By this arrangement when the bearing (not shown) is moved axially on a shaft from the right over the chamfer 13 onto the cylindrical peripheral surface 8', the left ring lip 7' functions as a tilting edge and makes the first contact with the peripheral surface of the shaft. This produces a conical deformation of the seal 6' so that it is deflected toward the right as shown and accordingly, the ring lip 7" is raised radially and is spaced from the peripheral surface 8' during the assembly operation. As in the previously described embodiment, the conical deformation of the seal is promoted by the annular grooves 14' which as illustrated are radially spaced in the seal body. Seal 6', therefore, deforms as if it were a membrane with creases. As noted above, in some instances the shaft is provided with an annular machined groove 15 of the type illustrated in FIG. 2. Thus, if the seal is assembled over this groove, the ring lip 7" on the right stands free of the surface 8' for the most part and in particular makes no contact with the sharp edges in the annular groove 15 as the bearing is pushed further onward out of the annular groove onto the following section. Only when seal 6' has reached its ultimate axial position (the lefthandmost position of the seal in FIG. 2) does the ring lip 7" on the right contact the peripheral surface 8 of the shaft. As noted above, this is accomplished, for example, by the first relative rotational movement between the outer ring or seal 6' and shaft and thus, the seal can fulfill its function without having suffered any damage during the assembly operation.

While particular embodiments of the present invention have been illustrated and described herein, it is not intended to limit the invention and changes and modifications may be made therein within the scope of the following claims.

What is claimed is:

1. Sealed roller bearing with a plastic jacket (5), adapted to form a seal (6) with a shaft (9) or the like, characterized in that the seal (6) has a bore surface (10) circumscribing the shaft and radially projecting circumferentially extending ring lips adjacent opposite axial ends of the bore surface having a diameter slightly less than the diameter of the shaft (9), said seal having radial side surfaces 11 and annular grooves (14) extending axially on both sides of the radial side surfaces (11) closely spaced to one another to form a hinge connection permitting a tilting action during assembly of the seal, one of said ring lips functioning as a tilting edge (12), which lifts the other ring lip radially from the sealing surface (8) of the shaft during axial displacement.

2. Sealed roller bearing with a plastic jacket (5), adapted to form a seal (6) with a shaft (9) or the like, characterized in that the seal (6) has a bore surface (10) circumscribing the shaft and at least one radially projecting circumferentially extending ring lip (7) located between opposite axial ends of the bore surface and having a diameter slightly less than the diameter of the shaft (9), the diameter of said bore surface being slightly greater than the diameter of the shaft surface, said seal having radial side surfaces 11 and annular grooves (14) extending axially on both sides of the radial side surfaces (11) closely spaced to one another to form a hinge connection permitting a tilting action during assembly of the seal, the bore surface and radial side surface (11) defining sharp edges on either side of said ring lip 7 which function as tilting edges (12), said ring lip radially from the sealing surface (8) of the shaft during axial displacement.

* * * * *